Oct. 11, 1960
L. J. NOVAK ET AL
2,956,039
METHOD OF MAKING QUICK CURING METAL
CONTAINING EPOXY RESIN COMPOSITION
Filed June 19, 1956
2 Sheets-Sheet 1
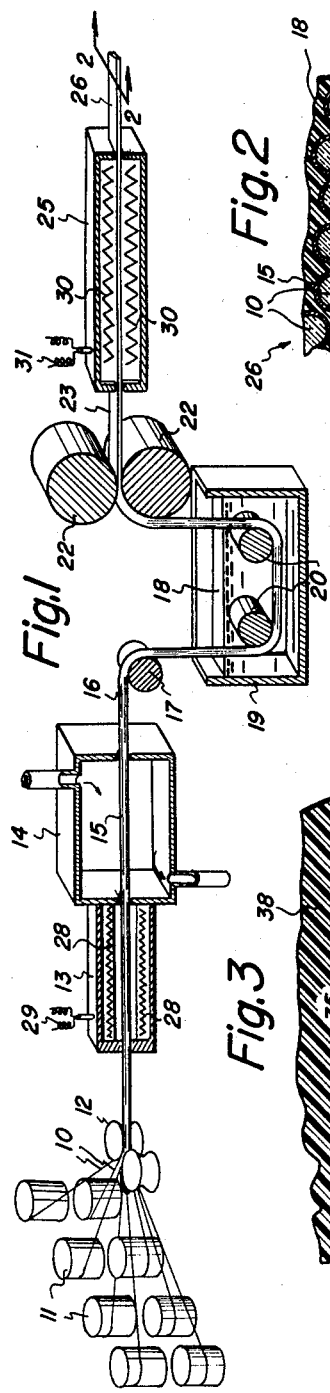
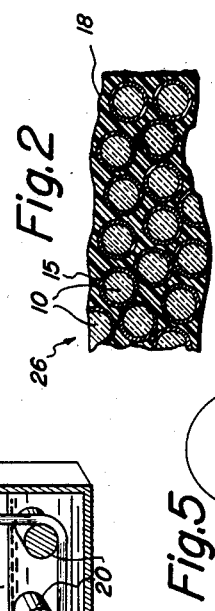
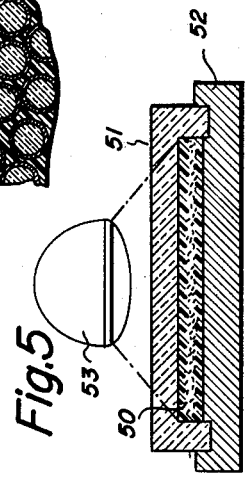
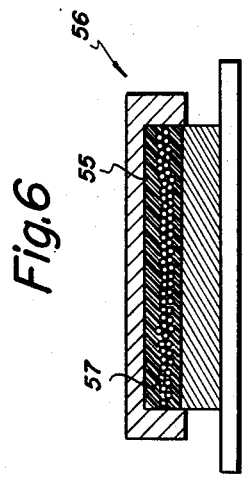
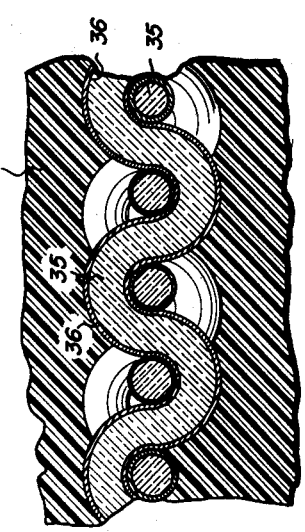
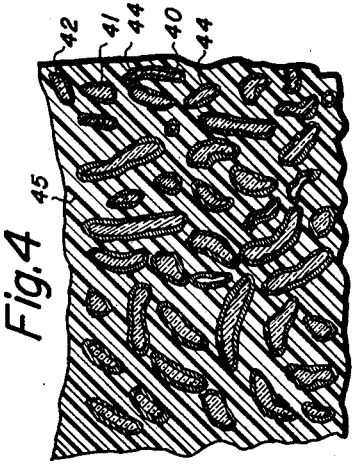
INVENTORS
LEO J. NOVAK
JAMES G. McCALLUM
BY Taulmin & Taulmin
Attorneys

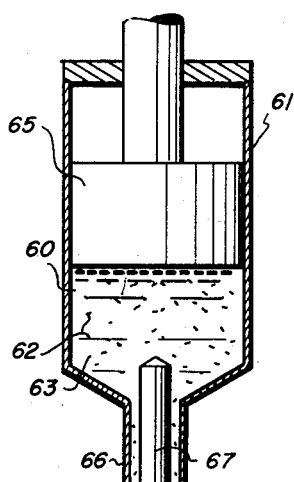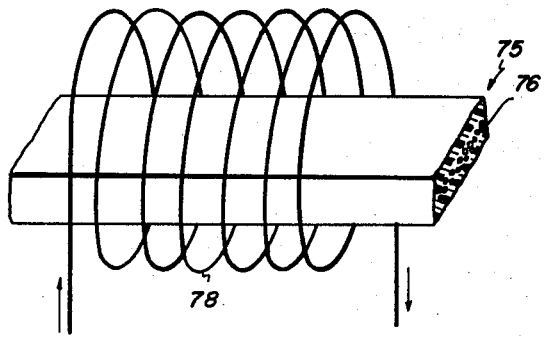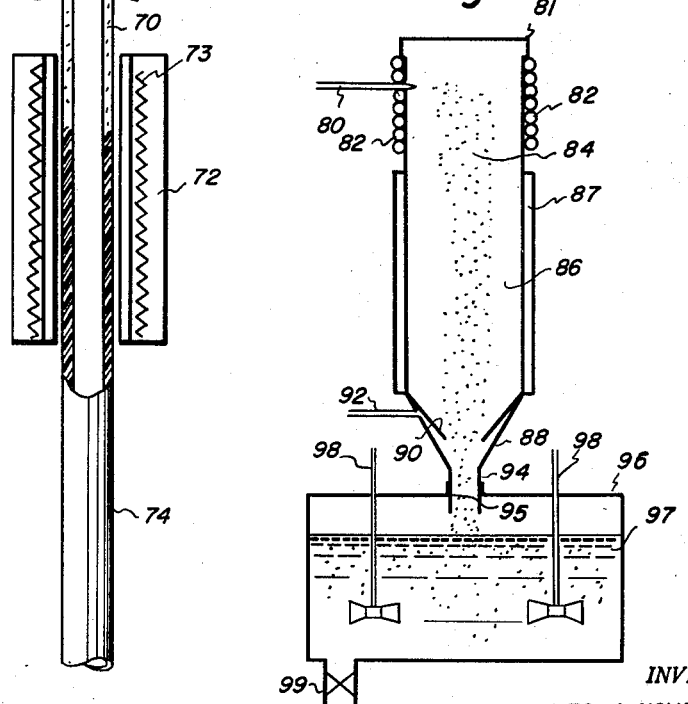

United States Patent Office
2,956,039
Patented Oct. 11, 1960

2,956,039

METHOD OF MAKING QUICK CURING METAL CONTAINING EPOXY RESIN COMPOSITION

Leo J. Novak and James G. McCallum, Dayton, Ohio, assignors, by mesne assignments, to Union Carbide Corporation, New York, N.Y., a corporation of New York Filed June 19, 1956, Ser. No. 592,315

2 Claims. (Cl. 260—37)

This invention relates to the production of plastic products, and more particularly to heat-cured plastic masses and to a method of decreasing the curing time of the same.

In the production of plastic masses and moldable products which are required to be heat-cured, it has been necessary to subject the material to heat for an extended period of time.

The curing of large masses of plastic, such as made of resinous material, generally requires many hours and in some instances, days. In accordance with the present invention, the curing time is greatly reduced by dispersing gas plated fibers or metal particles formed by gas plating in the resin prior to curing the same.

In prior curing methods one of the difficulties encountered, is that the resin or plastic material is not uniformly cured throughout the mass. For example, the inner or central portion of a resinous mass oftentimes is under-cured while the outer shell portion of the mass is over-cured. This is undesirable and produces an unsatisfactory product.

In accordance with the present invention, such plastic and resinous masses which are to be heat-cured are admixed with a metallized fiber or metal particles produced by decomposition of a gaseous metal compound, and wherein the metal particles or metal coatings possess relatively high heat conductivity. In the curing of such plastics wherein metallized metal particles formed by heat-decomposition of a metal bearing compound are dispersed therein, the curing time is substantially less than would otherwise be the case and the structure is tough and resistant to distortion stresses. This apparently is due to the uniformity of curing of the plastics or resin as a result of the presence of gas plated metal particles throughout the mass.

The invention is applicable for the curing of various masses, both thermoplastic and thermosetting materials, the metallized fibers or particles being combined with the plastic mass in varying proportionate amounts depending upon the particular resin or plastic mass used.

It is a principal object of the present invention to shorten the heating or curing time normally required to cure or polymerize a plastic mass and such as formed from natural or synthetic resins, polymeric substances or mixtures of such substances, and polyesters, epon resins and the like materials which are shaped and heat-cured.

Where gas plated fibers are used to provide the metal, such fibers or filaments may be composed of glass or siliceous material upon which the metal is deposited. In place of glass fibers, rock wool, asbestos and the like inorganic materials may be used. Organic materials or resins, natural or synthetic, likewise may be used as a base or core onto which metal is deposited by gas plating, for example cotton, wool or synthetic filaments or fibers such as made of nylon, Dacron, etc., the fibers being coated or metallized by gas plating so as to provide a metal coating of uniform thickness, which metallized fibers or filaments are then incorporated into the resin or plastic mass to be cured. Due to the superior heat conductivity of the metal coated fibers or filaments as dispersed or embedded into the plastic mass, the heat curing time is substantially lessened. Moreover, the curing is carried out uniformly throughout the plastic mass, the heat being conducted by molecular or electronic transfer through the plastic mass from point to point within the mass.

It is accordingly an object of this invention to provide a resinous heat-curable mass which can be shaped, as by molding, and rapidly cured by the application of heat to produce a product which is of improved strength and physical characteristics as compared to the same product wherein such metallized heat conductive particles are absent.

A further object of the invention is to provide a resinous mass or plastic material which is adapted to be heat cured and which can be shaped and cured at an accelerated rate as compared to the ordinary curing time.

Another object of the invention is to provide a novel composite body of metallized staple glass fibers and a resin, which exhibits increased heat conductivity and which may be molded and heat cured to provide a laminated glass fiber-resinous product which is cured uniformly throughout to provide a product having improved physical characteristics.

An additional object of the invention is to provide a product comprising metal coated glass fibers embedded in polyester resin or the like resinous material which can be heat cured by the application of infra-red rays, whereby the time of curing of the product is substantially reduced over like resinous masses free of heat-conductive metal fibers.

Glass fiber laminates have been prepared heretofore and which have been shaped and molded and then cured, but such laminates have required a relatively long time to cure, particularly when large masses of the resinous material is used and the product is thick walled. The present process provides an accelerated curing time whereby the production of fiber reinforced laminates can be produced in substantially half the time formerly required. The invention is particularly adapted to mass production of molded and cured articles and which can be made at a relatively high speed.

Briefly, the invention comprises providing a heat curable resinous or plastic mass having superior heat conductivity, by the introduction of finely divided metal particles or metallized fibers or filaments into the mass prior to shaping and heat curing of the product. The proportionate amount of metallized particles introduced depends upon the resin or plastic material used and its curing temperatures. In general a proportionate range of 5 to 50% by weight of metal or metallized fibers are introduced, based on the weight of the resin or plastic to be heat cured. More or less metallized material may be used with and without the additions of pigments, fillers, etc. where desired. The essential feature of the invention is that of incorporating metal which is preferably of high conductivity into the plastic mass to be heat cured. Metal particles of one to ten microns in size, e.g., nickel, iron, aluminum, copper or the like, are suitable. The metal is preferably in the form of a coating as deposited by gas plating fibers or filaments which are uniformly coated with metal and the resultant metallized fiber admixed with the resinous mass. The introduction of the metal as metallized fibers or filaments is preferred to the metal particles themselves, because of the tendency of the metal particles to settle out of the mass, where the resin or plastic mass is to be used immediately after incorporating the metal particles this is not a serious problem.

The instant invention will be described in more particularity with respect to the use of metal plated glass filaments or fibers in combination with resinous polymers which are to be heat cured, the use of substitute fibers and metal particles as produced by heat decomposing gaseous metal bearing compounds may, however, be employed, where the same is suitable. Preferably metallized glass fibers are used as produced by gas plating the hot filaments as drawn from a molten glass mass, the same being admixed with the resinous material as hereinafter described.

In the use of metal plated glass fibers in combination with a polyester resin or resinous polymers for example styrene or epoxy resins, the metallized fibers as produced by gas plating and carrying a coating of metal, e.g., nickel, are assembled and the mass is fed to a heated platen press for formation into the desired shape, after which the same is cured by the application of heat, or heat and pressure, and the finished product removed from the mold and trimmed, if required, to provide a finished product. Due to the shortened time required for curing the plastic body and the product is capable of being produced using existing high speed mass production machinery.

The metallizing of the fibers is preferably carried out by gas plating inasmuch as it is desired to provide the fibers with a coating of metal of uniform thickness. Polyester resins, such as polymerizable alkyd resin and vanyl-substituted heterocyclic tertiary amines and the like, are used which readily wet such metallized fibers and form an adherent bond between the metal and the resin. Metallized siliceous filaments may be extruded with the resin to permit the resin coated metallized siliceous body to flow substantially as a unit under the extrusion action.

Polyesters having good bonding properties such as the unsaturated alkyds copolymerized with styrene which are clear liquid thermosetting resins are particularly useful.

Polymerization inhibitors may be utilized in the customary manner to preserve the resins suitably during storage and such include guaiacol, hydroquinone and the like, which are introduced to the extent of about 0.2 to 1.0 percent by weight of the resin.

In the case of glass or siliceous material which form the core or fiber metallized, the glass may be a normal industrial composition of commerce adopted for example in electrical insulating purposes and which is substantially non-alkaline in nature. Other glasses may be used, particularly the low expansion boro-silicates. All silica glasses and particularly those having low coefficient expansion are useful for this purpose. In general, the gas plated metal film forms an effective seal to thus exclude moisture from entering the metallized glass fibers.

Glass fibers or filaments having a diameter less than one micron may be used although the diameter of the filament is not critical but is preferred to be of uniform diameter and such as suitable for forming a uniform heterogeneous mass of resin and metallized stable fibers or filaments. The presence or absence of a bonding agent on the fibers does not materially affect the glass fiber metal adherence.

The invention is further illustrated in the drawings accompanying the specification, and in which—

Figure 1 illustrates diagrammatically and partly in section an apparatus and method for producing a laminated resinous sheet material as a continuous process, which is fabricated out of metallized glass fibers and resin which is molded into a sheet and heat cured;

Figure 2 is a fragmentary view in cross section and on an enlarged scale, and taken substantially on the line 2—2 of Figure 1;

Figure 3 is a similar fragmentary cross section taken through a modified structure and wherein the glass fibers are woven into a mat and coated and impregnated with resin and cured similarly as illustrated in Figure 1, but utilizing a woven or felted mat of the metallized fibers;

Figure 4 is a like fragmentary view in cross section of a modified structure, wherein the metallized fibers consist of a heterogeneous mixture of different size and shape fibers which carry a metal coating or shell, to provide a heat conductive surface throughout the plastic mass or resin;

Figure 5 illustrates in cross-section a die in closed position and containing a moldable mass of resin and metallized fibers, and illustrating the use of an infra-red heating lamp for effecting the curing of the same, the upper die portion being made of transparent material to permit the passage of infra-red rays therethrough to effect curing of the plastic mass in the mold;

Figure 6 is a similar cross-sectional view as in Figure 5, wherein heat is applied directly to the upper mold plate while the same is held in position to mold the plastic mass of resin and metallized fibers as shown;

Figure 7 is a view in elevation, partly in cross section, illustrating diagrammatically extrusion apparatus for forming plastic pipe or tube, and wherein the same is extruded from a mass of resin and metallized fibers, the same being heat cured by moving the extruded pipe through a heater as shown in the drawing;

Figure 8 illustrates diagrammatically an apparatus for heat curing the molded mass of resin and metallized fibers which may be in the form of a sheet or rod, as shown by the use of electrical induction heating, the induction coil being illustrated as surrounding the molded sheet, whereby heat is induced into the mass through the metallized fibers as the mass is moved through the coil; and Figure 9 is a modification illustrating schematically an apparatus for producing metallized particles by gas plating and admixing the same with the resin or plastic mass to be shaped and heat cured.

Referring to the drawings, and more particularly to Figure 1, there is shown an apparatus for producing a plastic product formed of resin and metallized fibrous material, the same being molded and heat cured to form a sheet of material as a continuous process.

In the apparatus and method illustrated, filaments 10 which may be, for example, made of glass, are drawn from a storage spool 11 and guided over a roller 12 and thence through a heating oven 13 and into a gas plating chamber 14 wherein the fibers are gas plated to deposit a metal coating thereon, as indicated at 15. The metallized fibers 16 comprising a metal coating or sheath of metal are then moved from the plating chamber over a guide roll 17 and immersed in resinous plastic material 18, as contained in a tank 19. The metallized fibers 16 are submerged in the resin being guided around rolls 20 spaced longitudinally of the tank 19. Thereafter the resin coated metallized filaments are withdrawn from the resinous mass and guided between forming press rolls 22 and shaped into a laminated sheet 23. The metallized filaments of glass are embedded in resinous plastic material, as illustrated in Figure 2, and the strip 23 is then passed through a curing oven 25 and the metallized resinous sheet cured as the same is moved along. After curing of the resinous strip as a finished cured sheet 26, the same is transferred to storage or to machines for further treatment or fabrication into articles of commerce.

The heating elements for the ovens 13 and 25 preferably are resistance heater elements as indicated at 28 in the oven 13, the same being connected to an electrical source as at 29. Similar heating elements 30 are provided in the curing oven 25 which are connected to a suitable electrical source as at 31.

The molded and cured plastic sheet comprising metallized glass fibers or filaments and resin, as illustrated in Figure 2, the filaments have an outer shell or coating of metal 15, and provide a heat conductive as well as reinforcing constituent of the plastic product. The resinous material forms the continuous phase, as illustrated at 18 in Figure 2.

In the modified mass of plastic material shown in Figure 3, glass fibers or filaments 35 are woven into a mat, as illustrated, and the mat of material is subjected to gas plating to apply a coating of metal 36 on each of the fibers or filaments of the mat. Resin or plastic material 38 is used to impregnate and coat the woven mat of metallized fibers, the resultant resinous coated mass is then shaped and heat cured, as illustrated in Figure 1.

In Figure 4, metallized fibers 40, 41 and 42 are of different shapes and sizes. The fibers are gas plated with metal as at 44, so as to provide a heterogeneous mixture or dispersion of metallized fibers in resin or plastic, as shown at 45.

To cure the mass of resin and metallized fibers the same may be placed in a mold, as illustrated at 50, in Figure 5, mold halves 51 and 52 providing a mold cavity to receive and pressure-mold the mass of metallized fibers and resin to the desired shape. Heat curing is effected in this instance by the use of infra-red lamps 53 which are arranged above the mold, as shown in Figure 5. The upper mold half 51 preferably is transparent or formed of material which will allow infra-red rays to pass through so that the curing heat rays can be focused into the body of the resinous mass and onto the metallized particles.

In Figure 6 a similar molded mass of resin and metallized fibers is shown at 55, a die as generally indicated at 56 being used to apply heat and pressure to cure the resin. In this instance the fibers 57 are spherical in shape and of substantially uniform size diameter, the same being uniformly coated with metal by gas plating, as illustrated in Figure 1.

In Figure 7 a plastic pipe made by extruding a mass of metallized glass fibers and resin is illustrated. The plastic resinous mass 60 contained in a cylinder 61 and which is composed of metallized fibers 62 and resin 63 is extruded by movement of the piston 65 so as to press the plastic mass through the die section 66 of the mold. A central mandrel 67 is provided for forming a pipe or conduit of resinous metallized fiber mass which is extruded as at 70, in the form of a tube or the like. The extruded pipe is then drawn through a heater 72 which is arranged therearound and which may be heated electrically as by the electrical heated elements 73, as in Figure 1, to cure the resin and produce a finished pipe 74.

In the illustration shown in Figure 8, the resinous sheet 75 which contains metallized fibers 76 embedded therein is drawn through an induction coil 78 which is suitably connected at the ends of the coil to a source of electricity, whereby electricity flows through the coil, as indicated by the arrows, and around the molded plastic sheet 75. Electric current is induced into the metallized surface of the fibers 76 to effect curing of the resin. The induction coil heating is preferably used to heat cure small masses of the resinous and metallized fibers and such as do not require a large amount of heat. The filaments in this instance where induction is employed to cure the resin are continuous filaments and which have been uniformly coated with metal so that the electric current can flow by induction through the molded sheet of material and heat the same. If desired, additional heat may be imparted to the molded sheet as by the use of electrical heating elements or infra-red lamps.

In the use of the metallized fibers it is important to employ a metal for coating the fibers which has a high heat conductivity. For this purpose, a metal aluminum, nickel and the like metal which can be gas plated onto fibers or filaments is employed because of their high heat conductivity. The heat conductivity of aluminum increases as the temperature increases, for example at 200° C. the conductivity is 0.55; at 300° C. the conductivity is 0.64; at 400° C. the conductivity is 0.76 and at 600° C. the conductivity is 1.01.

In the case of nickel although the heat conductivity decreases somewhat with a raise in temperature, it is a good heat conductor and can be readily gas plated using the metal carbonyl.

Utilizing nickel carbonyl to provide nickel plated glass fibers, in accordance with this invention, it has been observed that glass fiber rovings consisting of ten strands (containing approximately 7.1% nickel metal) has about five times the thermal conductivity of like glass fibers which are unplated. Moreover, such nickel gas plated glass fibers are capable of carrying 180 milliamperes of current at a potential of 32 volts, with 178 ohms resistance. Plastic metallized resinous products having uniformity of cure and high electrical conductance find particular utility in the electrical industries, as for example, in the manufacture of shielding and coaxial cables.

Test results made with nickel plated glass fibers or filaments further have shown that there is no loss of tensile strength of glass fibers as a result of the nickel gas plating process. This property enhances the commercial value of plastics made in accordance with this invention.

Inasmuch as it is desired to have a high heat conductivity in the metal in order to effect rapid curing of the resinous mass, it is preferably to use metals having a high heat conductivity and metals which retain their high heat conductivity at the temperatures of curing. To provide metallized fibers of metals e.g. nickel, iron, chromium and molybdenum, the carbonyls of the respective metals may be utilized which are heat decomposed in contact with the fibers to deposit a film or coating of metal thereon.

In preparing aluminized fibers the same may be gas plated by utilizing isobutyl aluminum. This compound begins to decompose at about 300° C. and can be made to plate uniformly on the fibers or filaments such as glass, by heating the filaments while in contact with aluminum isobutyl at a temperature between about 300 and 450° C. which causes decomposition of the aluminum compound and deposition of aluminum metal thereon to thus provide an aluminized filament or fiber of glass. These metallized glass fibers are then incorporated into the plastic mass which is heat cured. Where aluminum metal detracts from the color or other desirable properties of a resin, then instead of aluminized fibers, nickel or chromium plated fibers are preferably used.

*Example I*

As an example of one embodiment of the invention, aluminum plated glass fibers having a diameter of 10 microns and of indefinite length were gas plated with aluminum utilizing aluminum isobutyl as aforementioned, and wherein the glass filaments were heated to a temperature to cause decomposition of the aluminum compound, the heated filaments being brought in contact with the aluminum isobutyl to cause the same to decompose and deposit aluminum metal onto the fibers or filaments, the process being carried out in an atmosphere of nitrogen. The resultant aluminized filaments having a film of aluminum metal of a thickness of about 0.001 inch are then admixed with styrene resin, the filaments comprising 20% by weight of the resin. Benzoyl peroxide catalyst in the amount of 1% by weight of the mass is introduced and the mass of styrene and aluminized filaments molded in a die in the form of a laminated sheet and the sheet then subjected to heat curing for 10 minutes at 238° F.

Where the resinous mass is increased and found to be insufficiently cured the time and temperature is varied to accomplish this, employing such temperature and time as required to completely and uniformly cure the resin.

*Example II*

In this example a polyester resin used was 4-vinyl-2-methylpyridine and the curing temperature was effected at 100° C. for two minutes.

Example III

In this example nickel plated glass filaments of approximately 20 microns in diameter were coated by subjecting the filaments to nickel carbonyl at a temperature of about 400° F. A metal coating of approximately 0.002 inch is uniformly applied to the fibers. The nickel gas plated fibers are mixed in resin as described in Example I.

Example IV

Metallized fibers formed of nylon and nickel as gas plated from nickel carbonyl as in Example III were utilized in this case, with a resinous mass containing phenolformaldehyde resin, the fibrous mass constituting in this instance 15% of the resinous mixture and being cured at a temperature of 300° F. for 45 minutes. The resin may be made by treating equal volumes of commercial formaldehyde solution (35% formaldehyde in water) with phenol in a reaction vessel to 325° F. and the product freed of uncombined aldehyde and water. Plastic tubing may be extruded using the laminated resinous mass and heat cured to convert the resin into a heat resistant body.

Example V

Iron plated glass fibers of substantially one micron diameter are provided, which fibers have been gas plated utilizing iron carbonyl. The iron plated fibers are then added to a resinous mass comprising epoxy resin. The resultant iron plated fibers being added in an amount of 10% by weight of the resinous fiber mixture and the mass molded to shape and heat cured by infra-red lamps at a temperature of 200° F. for five minutes.

The epoxy resin may be made as follows, the parts being by weight unless otherwise stated:

To a vessel provided with a stirrer and external cooling means, there is introduced 276 parts (3 mols) of glycerine and 828 parts (9 mols) of epichlorhydrin. To this reaction mixture is added 1 part of 45% boron trifluoride ether solution diluted with 9 parts of ether. The reaction mixture is agitated continuously and reacted for one and one-half hours, after which time cooling ice water is applied to stop the reaction, the temperature being held between 50 and 77° C. for the reaction period.

To 380 parts of the resultant product is reacted with 900 parts of dioxane and 300 parts of sodium aluminate, in a vessel equipped with a reflux condenser. With continuous agitation the reaction mixture is heated gradually to 95° C. over a period of one hour and a half. After cooling to room temperature the inorganic material is removed by filtration. The resin is recovered by distilling off the dioxane in the filtrate at 205° C. and 20 mm. pressure. A resin having an epoxide equivalent of 149 and molecular weight of 324 results. The resin has an average of 2.175 epoxide groups per molecule.

Example VI

Example V was repeated utilizing an epoxy resin made by reacting 4.3 parts diglycid ether and 2.2 parts hydroquinone, 0.02 part of sodium phenoxide being added. The reaction mixture is heated at 100° C. for one and one-quarter hours to produce a viscous resin having an epoxide equivalent of 350. A 75% solution of the resultant resin in equal parts of water and ethyl alcohol and 1% sodium phenoxide was used as an epoxy resinous mass mixed with the gas plated metallized fibers to form a glass fiber impregnated sheet one-half inch thick which was converted to a hard, tough product when heated under infra-red lamps at 200° C. for ten minutes.

By coating the inorganic or organic fibers with a uniform thickness of metal as by gas plating, there is provided a flexible high strength fiber which not only provides a relatively high heat conductivity throughout the mass of resin cured, but also reinforces the resinous mass which is a desirable added property. The metallized fibers provide a more uniform cure in a unit time as compared to ordinary resin masses which are heat cured and the amount of heat conductive metallized fibers can be varied to suit the different conditions and different resins which may be employed. The heat can be imparted by conduction from the outside surface as by heating the die surface or through the use of infra-red lamps and can be made to penetrate into the resin mass and metallized fibers whereby the heat is conducted into the body of the plastic mass and selectively adsorbed and distributed throughout the mass so that there is effected a uniform curing of the resin mass and thus a product is formed which does not tend to warp or become distorted, nor to have under-cured areas throughout the mass.

Example VII

A plastic mass composed of a resinous mixture in parts by weight of 57 parts of bis-phenol, 195 parts of diglycid ether, 46½ parts of aniline and 15 parts of sodium hydroxide is mixed with 25% by weight of aluminum gas plated fibers, the fibers being short staple fibers formed by blowing attenuated glass filaments into a chamber filled with aluminum isobutyl vapor to deposit aluminum metal thereon to provide a coating film of metal approximately 0.0001 inch in thickness on each fiber.

A molded resinous mass of woven fabric thus aluminized and impregnated with resin was converted to an infusible product by heating for fifteen minutes at 100° C. This is approximately half the time required for heat curing the resin alone at this temperature.

Where the metallized fiber is to be heated by the electrical induction type of heating, the metal coating on the fibers or filaments is formed of magnetic metal such as iron, steel, cobalt and the like.

The product of the invention utilizes the improved heat conductivity of the metallized fibers to evenly distribute the heat throughout the mass so as to produce a uniformly cured product and one which is cured in a relatively short time.

In Figure 9 there is illustrated schematically an apparatus for admixing metal particles directly to the resin as the metal particles are formed by heat decomposition of gaseous metal bearing compounds. Metal carbonyl, e.g. nickel carbonyl gas is introduced through conduit 80 to the chamber 81 at the upper section. The metal bearing gas is heated to a temperature of 250° F. to cause decomposition of the gaseous metal carbonyl. The heating is provided by the coils 82 arranged about the upper section of the chamber 81. Fluid heated to 350° F. is passed through the coils. Upon decomposing of the gaseous carbonyl metal particles precipitate as at 84 and are cooled by passing downward through the lower water-cooled chamber portion 86. A cooling jacket 87 is suitably arranged around the chamber for this purpose.

The lower portion of the chamber 81 is funnel-shaped as at 88 and provided with an inner annular baffle wall 90 and exhaust line 92 through which waste gases are withdrawn from the chamber 81. A cylindrical adapter portion 94 extends into the opening 95 in the top of the container in which is charged the resinous mass 97. The container is equipped with stirrers 98 and valved discharge opening 99 through which the resin metal powder mixture may be withdrawn.

In the use of the combination metal powder producing and resin blending apparatus as illustrated in Figure 9, the incorporation of metal powder as formed directly from gaseous metal-bearing compounds can be carried out while the metal particles are retained free of oxidizing atmosphere and while in a nascent or substantially pure state. This provides a resinous metal powder moldable product wherein the product can be cured in relatively less time and due to the nascent and unoxidized state of the metal introduced into the resin a less proportionate amount of metal is required to produce the accelerated curing results. This is believed to be due to the fact that the metal particles as made from the carbonyl are simultaneously formed and admixed with the resin in the production of the resinous metal powder composition.

It will be understood that this invention is susceptible to various modifications and changes in the proportionate amounts of the constituents incorporated as may be required with different resins and plastic mixtures, and accordingly it is understood that such modifications as come within the scope of those skilled in the art are included within the obvious modifications of this invention and as more fully set forth in the appended claims.

What is claimed is:

1. The method of making a heat-curable epoxy resin having a shortened heat-curing time which consists in confining a heat-curable epoxy resin composition in an inert and unoxidizing atmosphere containing a heat-decomposable gaseous metal carbonyl selected from the metals of the group consisting of nickel, iron, copper, chromium and molybdenum, heating said epoxy resin composition and said atmosphere while in contact with said resin composition to cause thermal decomposition of said metal carbonyl and precipitation of nascent metal particles onto the surface of the epoxy resin composition, and admixing and blending said metal particles into said resin composition, said metal particles constituting from about 5 to 50% by weight of said heat-curable resin composition.

2. The method of making a heat-curable epoxy resin having a shortened heat-curing time which consists in confining a heat-curable epoxy resin composition in an inert atmosphere containing nickel carbonyl, heating said epoxy resin composition and said atmosphere while in contact with said resin composition to cause thermal decomposition of said nickel carbonyl and precipitation of nascent nickel metal particles onto the surface of the epoxy resin composition, and admixing and blending said metal particles into said resin composition, said nickel metal particles constituting from about 5 to 50% by weight of said heat-curable resin composition.

References Cited in the file of this patent

UNITED STATES PATENTS

| | | |
|---|---|---|
| 2,393,541 | Kohler | Jan. 22, 1946 |
| 2,699,415 | Nachtman | Jan. 11, 1955 |
| 2,748,099 | Bruner et al. | May 29, 1956 |
| 2,774,747 | Wolfson et al. | Dec. 18, 1956 |